United States Patent [19]

Volkmann et al.

[11] 4,326,825

[45] Apr. 27, 1982

[54] BALANCED PIN FOR SHEAR FLOW JOINT, AND JOINT INCLUDING THE PIN

[75] Inventors: Josef F. Volkmann; Edwin E. Hatter, both of Torrance; Michael M. Schuster, Santa Monica, all of Calif.

[73] Assignee: Hi Shear Corporation, Torrance, Calif.

[21] Appl. No.: 108,959

[22] Filed: Dec. 31, 1979

[51] Int. Cl.³ .................. F16B 5/02; F16B 31/02; F16B 35/00

[52] U.S. Cl. .................. 411/5; 411/361; 411/424

[58] Field of Search ............ 411/5, 3, 2, 424, 411, 411/378, 361, 360, 510; 403/408

[56] References Cited

U.S. PATENT DOCUMENTS

| | | | |
|---|---|---|---|
| 2,396,661 | 3/1946 | Keller et al. | 411/361 |
| 2,895,367 | 7/1959 | Nagy | 411/378 |
| 2,955,505 | 10/1960 | Schuster | 411/361 |
| 3,390,906 | 7/1968 | Wing | 411/427 X |
| 3,578,367 | 5/1971 | Harvill et al. | 411/360 X |

Primary Examiner—Ramon S. Britts
Attorney, Agent, or Firm—Donald D. Mon

[57] ABSTRACT

A metallic balanced pin for a shear flow joint, and a fastener and joint including the pin. The pin has a head, a cylindrical shank and a reduced neck. The neck includes a peripheral groove, a helical thread being an example. The inherent strengths of the head and groove are substantially equal and only sufficient to resist axial tensile forces exerted by bending in a shear flow joint. The inherent strength of the shank section is sufficient to resist shear forces in the joint. Preferably the intersection of the neck and a transition section connected to the shank section is locally work-hardened to resist fatigue forces.

25 Claims, 5 Drawing Figures

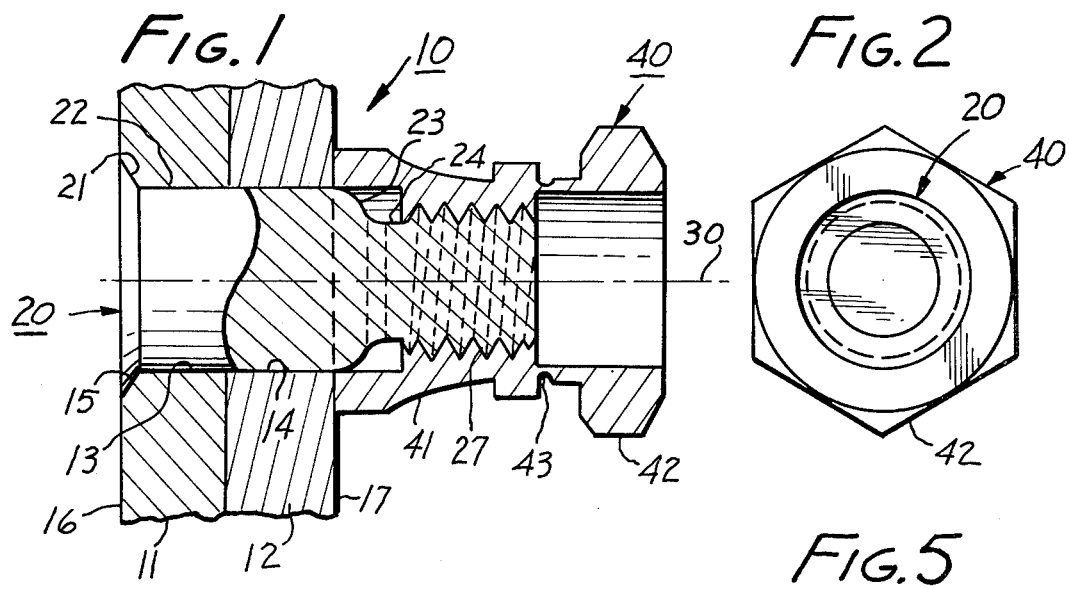
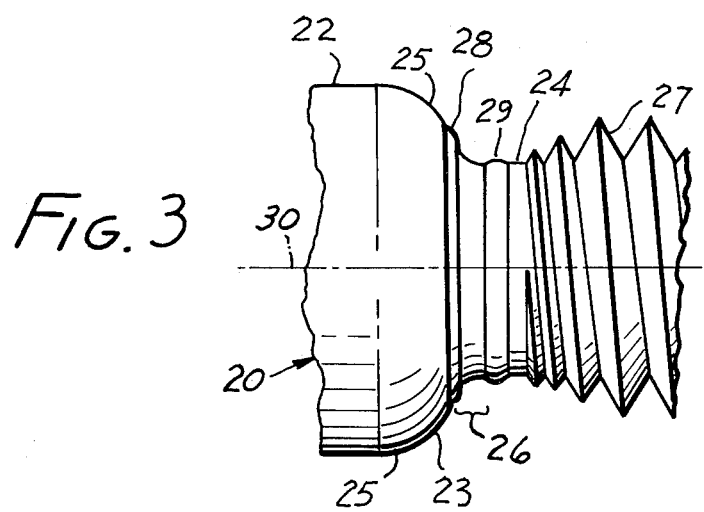
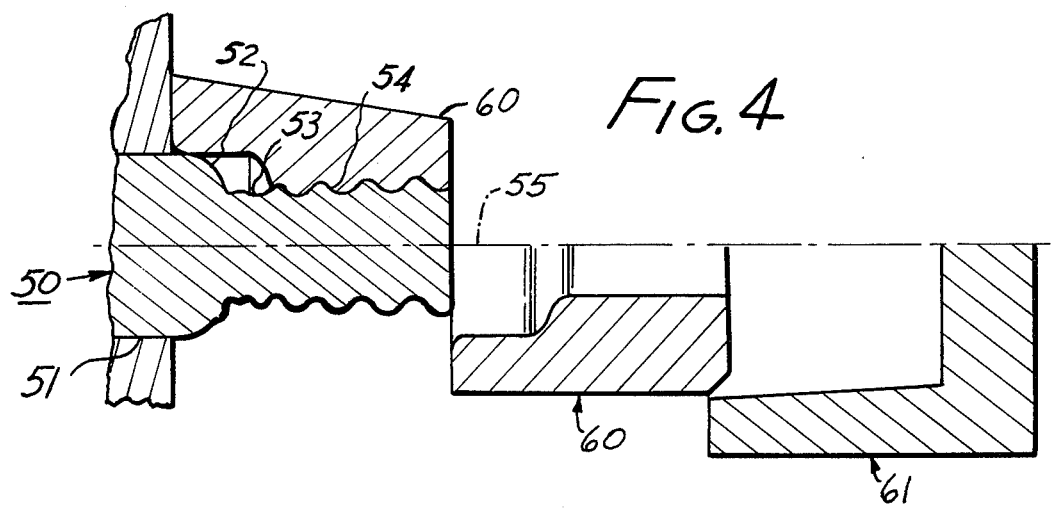

BALANCED PIN FOR SHEAR FLOW JOINT, AND JOINT INCLUDING THE PIN

FIELD OF THE INVENTION

This invention relates to a pin for use in a shear flow joint, and to the joint itself and also to the combination of the pin and a fastener.

BACKGROUND OF THE INVENTION

Shear flow joints, which are very commonly used in aircraft, include two or more members such as metal sheets that are held together by fastening devices which include a pin that passes through aligned holes in the members. The shank of the pin has adequate strength of material and cross-section area to resist and transfer the shear forces exerted on the joint. These forces are often quite large. The fastening means must also be able to resist the axial tensile forces developed as a consequence of bending of the joint. For this purpose, the pin has a head and a peripheral groove, and a fastener can be applied to the groove so the joint members are clamped between the head and the fastener. These forces are generally considerably smaller than the shear forces.

It has been the usual practice to form the head and groove in a conventional configuration, with the result that the head and grooved sections are too strong and heavy. This has a dual penalty. First, excess weight is undesirable in any flying device, and second, materials such as titanium are so expensive that the unnecessary material is not truly affordable.

It is an object of this invention to provide a pin for this type of joint in which the head and groove strengths are substantially equal, and only strong enough to resist the axial tensile forces generated by bending in the joint. On the other hand, the shank of the pin can be made as large as desired in order to transfer the applied shear load. Thus, a balanced pin is provided which has no excess weight, and which does not waste material.

It is another object of this invention to prepare the pin in such a way that it optimally resists fatigue forces at a critical region near the end of the cylindrical shank.

BRIEF DESCRIPTION OF THE INVENTION

A metallic balanced shear flow pin according to this invention includes a head section, a cylindrical shank section, a transition section and a reduced neck section in that order. A peripheral groove such as a thread or ring groove is formed on the reduced neck section. The inherent strengths of the head section and of the peripheral groove to resist axial tensile forces are substantially equal, and only enough to resist such forces developed by bending of the joint. The inherent strength of the cylindrical shank section to resist shear forces is adequate to resist the shear forces across the joint.

According to a preferred but optional feature of the invention, the transition section includes an intersection with the neck section which is locally work-hardened to resist fatigue forces in this region.

The above and other features of this invention will be fully understood from the following detailed description and the accompanying drawings, in which:

BRIEF DESCRIPTION OF THE DRAWINGS

FIG. 1 is an axial cross-section of the presently-preferred embodiment of the invention;
FIG. 2 is a right hand end view of FIG. 1;
FIG. 3 is an enlarged view of a portion of FIG. 1;
FIG. 4 is an axial cross-section of another embodiment of the invention partially illustrated in the set condition, and partially illustrated in the unset condition; and
FIG. 5 is a side elevation of a fragment of an optional section of the pin in FIG. 1.

DETAILED DESCRIPTION OF THE DRAWINGS

FIG. 1 shows a shear flow joint 10 comprised of a pair of joint members 11, 12, in this case two metal sheets or plates, for example aluminum alloy or titanium alloy sheets or plates. This joint and the pin and fastener can, of course, be incorporated with members which are other than sheets or plates. Fittings mounted to plates are an example.

Sheets 11 and 12 have respective aligned holes 13, 14 therethrough. If appropriate, a countersink 15 is formed at a first outer face 16 of sheet 11. A second outer face 17 is formed on sheet 12.

A metal shear flow pin 20 is fitted in the aligned holes. Preferably but not necessarily if forms an interference fit; that is, the pin is somewhat larger than the holes, which prestresses the walls of the holes and renders the joint more resistant to fatigue. Interference fits are well-known, and require no detailed description here.

Pin 20 includes the following sections in the order recited: head section 21, cylindrical shank section 22, reducing transition section 23, and neck section 24.

The transition section interconnects the shank section and the neck section. It includes a rounded shoulder 25 contiguous to the shank section, and an intersection 26 contiguous to the neck section.

The neck section carries a peripheral groove 27. In the preferred embodiment, this groove is a conventional helical thread rolled onto the neck section. The thread runs out shortly before it reaches intersection 26. Intersection 26 is locally work-hardened. The preferred technique is strongly to roll this intersection with a roll die. This will displace metal to each side in waves 28, 29. Importantly, these waves exist at places where they do not impede any function. The work-hardening of the intersection causes this region to be much more resistant to fatigue forces than it would be without the work-hardening. Because this region is at the place of a relatively abrupt change of shape, resistance to fatigue is of considerable importance. This is, however, optional.

The transition section is shown as a surface of revolution making a non perpendicular angle with central axis 30 of the fastener. Optionally, it could also be formed as a plane lying normal to said axis. The intersection would then be located at and adjacent to the radius which would exist where the transition section and neck section join.

A helical thread with a constant crest diameter and root diameter is only one type of useful peripheral groove. Another type, which is not illustrated, is a ring-type groove which extends around the neck section in a plane. There may be one or more of these, and they may or may not all have the same dimensions.

Also, a helical groove need not always have a constant crest and root diameter. There are applications wherein a crest diameter is provided which enlarges as it extends away from the head end. The root diameter may or may not change.

The head section in FIG. 1 is formed as a countersink head for use in a countersink. If the application does not call for a countersink, a protruding head such as head 35 (FIG. 5) can be provided. The term "protruding" means a head which projects beyond the first outer face.

The shear flow joint is completed by a fastener device 40. Because this joint is designed with such close attention to minimizing the head section and neck section weight and strength, it is advantageous to use a fastener device which is torque-sensitive, so as to be settable to some maximum torque, but not to exceed it. Then as optimum joint will be made. The presently preferred fastener device for this purpose is the well-known Hi-Lok collar, manufactured by Hi-Shear Corporation, Torrance, California. This collar is the subject of U.S. Pat. No. 3,390,906, issued July 2, 1968, which is incorporated herein in its entirety for its showing of such a collar. Reference may be made to this patent for more details concerning this collar.

Briefly stated, collar 40 includes a nut 41, a drive section 42 adapted to be engaged and turned by a torque tool, and a shear section 43 which fractures upon the application of a pre-determined torque. The drive section falls away, and leaves the nut tightened onto the pin with a correct applied torque, and which correctly axially pre-loads the joint. The nut includes a counterbore 44 that receives and clears the transition section, and any part of the shank which may project beyond the second outer face, perhaps as the consequence of a stack-up of dimensional tolerances.

The fastener device in FIGS. 1—3 is set by torquing. It is also possible to make up the joint with a swaging-type operation.

For example, in FIG. 4, a pin 50 is shown, which has a head section (not illustrated) as in FIG. 1 or 5, a shank section 51, a transition section 52 and a neck section 53. Instead of the straight helical thread of FIG. 1, it is provided with a series of peripheral grooves 54 each of which lies in its own respective plane normal to central axis 55. The crest diameters increase as the grooves progress toward the neck (second) end of the pin. The roots of the grooves may conveniently all have the same diameter, or may also increase if preferred.

A helical thread with a growing crest diameter could be used instead of the illustrated grooves.

A ring-like collar 60 is adapted to be swaged into the grooves. It is made of a ductile metal which is displaced by a bell-mouthed swaging tool 61 which is forced to the left in FIG. 4 from the position shown below the axis, to press the collar against the second outer face, and move material into the grooves. When the crest diameter increases, an increased axial preload can be exerted on the pin as described in U.S. Pat. No. 2,955,505, issued Oct. 11, 1960, which is incorporated herein by reference.

When a helical groove is used, even if the crest diameter increases, the set collar can later be removed by running it, simply by exerting enough force that the thread displaces the material of the collar as it goes.

In order to minimize the weight of the pin, the inherent axial strength of the head section and of the peripheral groove are made substantially equal. Which fails first is random. Also this strength is selected to be the least necessary to resist the axial forces developed by bending in this joint. Such values are readily calculable by persons skilled in the art. What is evident is that only a very small head and a very small neck section is needed. This can reduce the weight of some short pins by as much as 20% compared to conventionally designed pins.

In view of the rather abrupt and marked change in size, the work-hardening of the intersection is quite valuable, and resists fatigue forces at this critical junction.

A rolled thread has the additional advantage of work-hardening, and permitting a same strength to be obtained with a smaller neck section.

The diameter of the shank is also subject to determination of the designer. It is selected to be resistant to a predetermined shear force.

The pin can be made of any suitable metallic material. Aluminum alloys and titanium alloys are useful examples. A work-hardened material is preferred.

Thus, this invention provides to the designer a balanced pin which has only the strengths needed for each of its various functions, and thereby can be made lighter in weight than conventional fasteners. The resulting joint is also lighter, and still provides the requisite structural joinder.

This invention is not to be limited by the embodiments shown in the drawings and described in the description, which are given by way of example and not of limitation, but only in accordance with the scope of the appended claims.

We claim:

1. A metallic balanced shear flow pin having a first and a second end and a central axis, said fastener comprising a head section, a cylindrical shank section, a transition section, a neck section, and a peripheral groove on said neck section, said sections being coaxial with one another, and provided in the order recited from said first end, said head section and peripheral groove having respective inherent strengths to resist axial tensile forces, and said cylindrical shank section having a respective inherent strength to resist lateral shear forces, said cylindrical shank section having a diameter, and said head and neck sections having respective lateral dimensions, said diameter being smaller than any lateral dimensions of said head and greater than any lateral dimensions of said neck section and of said peripheral groove, said transition section reducing the lateral dimensions of said pin between said cylindrical shank section and said neck section, and including a shoulder contiguous to said cylindrical shank section and a non-threaded intersection contiguous to said neck, said pin being made of material which can be work-hardened, and said intersection being work-hardened the better to resist fatigue forces, said inherent strengths of said head section and peripheral groove being substantially equal and only sufficient to resist axial tensile forces exerted by bending in a shear flow joint, and said inherent strength of said cylindrical shank section being sufficient to resist shear forces in said joint.

2. A pin according to claim 1 in which said inherent strength of said head section and of said peripheral groove are sufficiently close that which one fails first in tension is random.

3. A pin according to claim 1 in which said peripheral groove is a helical thread rolled into said neck section.

4. A pin according to claim 1 in which said peripheral groove is a thread having a crest diameter which increases as the thread extends away from said first end.

5. A pin according to claim 4 in which said thread has a root diameter which for part of the axial extent of said thread is constant.

6. A pin according to claim 1 in which said peripheral groove comprises at least one continuous ring-like groove.

7. A pin according to claim 1 in which said head section is a countersink head.

8. A pin according to claim 1 in which said head section is a protruding head.

9. A pin according to claim 1 in which said transition section between said shoulder and said intersection is substantially normal to said axis.

10. A pin according to claim 1 in which said transition section between said shoulder and said intersection is a surface of revolution that lies at a non-perpendicular angle to said axis.

11. A pin according to claim 1 in which said thread is rolled onto said neck, and in which said intersection is work-hardened by rolling.

12. A pin according to claim 11 in which metal displaced by the work-hardening flows to locations in the transition section and in the neck section which are out of contact with a metal element and a fastener which form a joint with said pin.

13. In combination: a pin according to claim 1, and a fastener attachable to said pin.

14. A combination according to claim 13 in which said fastener is a collar.

15. A combination according to claim 14 in which said groove is helical thread, and said collar is an internally threaded nut.

16. A combination according to claim 15 in which said collar includes drive means to apply torque to said nut, said drive means being disabled upon the application of a pre-determined torque.

17. A combination according to claim 16 in which a shear section joins said drive section to said nut to shear at said predetermined torque and release said drive section from said nut.

18. A combination according to claim 15 in which said thread has a crest diameter which increases as the thread extends away from said first end.

19. A combination according to claim 14 in which said collar is swageably deformable into said peripheral groove.

20. A combination according to claim 19 in which said groove is a thread which has a crest diameter which increases as the thread extends away from said first end.

21. A joint comprising: a plurality of metal members having aligned holes therethrough, with a first outer face on one of said members, and a second outer face on another of said members; a pin according to claim 1 passed through said holes with its head against said first outer face, and with its neck projecting beyond said second outer face; and a collar attached to said thread and bearing against said second outer face, said collar exerting, with said head section, an axial tensile force in said pin, said cylindrical shank section fitting in said holes to resist shear forces between said members.

22. A joint according to claim 21 in which said cylindrical shank element makes an interference fit in said holes.

23. A joint according to claim 21 in which said collar includes drive means to apply torque to said nut, said drive means being disabled upon the application of a pre-determined torque, and from which said drive section has been removed as the consequence of applied torque.

24. A joint according to claim 21 in which said collar has been swaged into said groove.

25. A joint according to claim 21 in which said groove is a thread which is rolled onto said neck section, in which said intersection is work-hardened by rolling, and in which metal displaced by the work-hardening has flowed to locations in the transition section and in the neck section which are out of contact with said members and said collar.

* * * * *